May 9, 1939.    R. E. MARBURY    2,157,909
PREVENTION OF INDUCTIVE INTERFERENCE
Filed Dec. 17, 1937
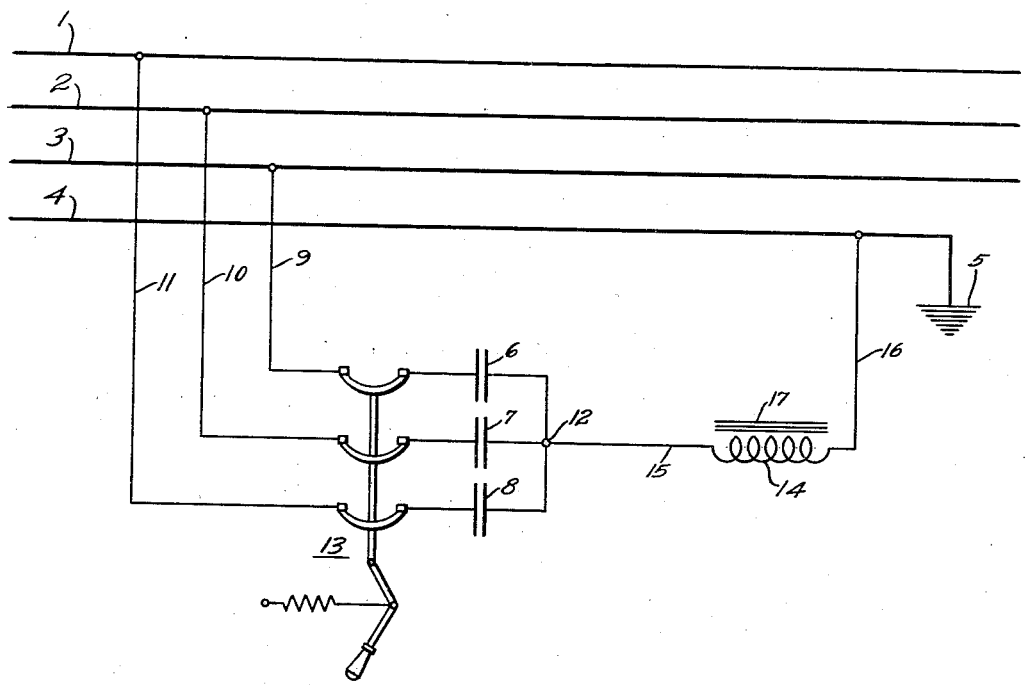
WITNESSES:
INVENTOR
Ralph E. Marbury.
BY
ATTORNEY Patented May 9, 1939

2,157,909

UNITED STATES PATENT OFFICE 2,157,909

PREVENTION OF INDUCTIVE INTERFERENCE

Ralph E. Marbury, Wilkinsburg, Pa., assignor to Westinghouse Electric & Manufacturing Company, East Pittsburgh, Pa., a corporation of Pennsylvania Application December 17, 1937, Serial No. 180,405

9 Claims. (Cl. 171—97)

This invention relates to the problem of inductive interference between power transmission or distribution lines and adjacent communication lines and, more specifically, to the prevention of harmonic currents in the neutral conductors of three-phase, four-wire systems.

When communication circuits, such as telephone or telegraph lines, are located near power transmission or distribution lines, and especially if they run generally parallel to each other, the mutual induction between the two lines will produce an electromotive force in the communication line. This, of course, is highly objectionable since it interferes with proper reception of messages carried by the communication line. In a three-phase, three-wire system with a balanced load, such interference can be eliminated by transposition of the power line so that the induced electromotive forces in adjacent sections of the communication line will be out of phase and will neutralize each other. This is only effective, however, where the load is balanced, and there is no neutral. If the system has a neutral conductor connected to ground, the electromotive force induced by currents flowing in the neutral will not be affected by transposition of the phase conductors and will cause objectionable interference.

One case in which such currents are caused to flow in the neutral occurs when a star-connected capacitor bank is used on a four-wire system having a grounded neutral conductor. Such capacitor banks are often used for the purpose of power-factor correction and, when the neutral point of the capacitor bank is connected to the neutral conductor, relatively large currents of third harmonic frequency and its multiples may appear in the neutral. The higher harmonics are usually small enough to be negligible, but in some cases, the third harmonic is large enough to cause serious inductive interference on adjacent communication lines. Some means must therefore be provided to suppress this harmonic current but it is also necessary to provide for a large enough current flow of fundamental frequency to operate a circuit breaker or other protective device in case of failure of one of the capacitors.

The object of the present invention is to prevent or minimize inductive interference caused by a three-phase, four-wire transmission or distribution line having a grounded neutral.

A more specific object is to substantially prevent the flow of third harmonic current in the neutral of a four-wire system having a star-connected bank of capacitors connected thereto.

These objects are attained by connecting an iron-core reactor of special design between the neutral point of the capacitor bank and the neutral conductor of the system. This reactor is designed to saturate at substantially less than the normal phase-to-ground voltage of the system and preferably at about 50% of this voltage. Under normal condition, the impedance of the reactor will be high enough to substantially prevent the flow of third harmonic current in the neutral, but in the event of failure of one of the capacitors, the reactor, because of its low saturation, will permit a large enough flow of current of fundamental frequency to cause operation of a protective device and isolate the capacitor bank from the line.

The invention will be more fully understood from the following detailed description taken in connection with the accompanying drawing, the single figure of which shows the connection of a capacitor bank to a three-phase transmission line according to the present invention.

As shown in the drawing, reference characters 1, 2 and 3 are the phase conductors of a three-phase transmission or distribution line, and reference character 4 is the neutral conductor which is connected to ground as indicated at 5. A capacitor bank, consisting of three capacitors 6, 7 and 8, is connected to the line by conductors 9, 10 and 11. The capacitor bank is star-connected, having a neutral point 12, and a current-responsive circuit interrupting device 13 is connected between the capacitor bank and the line. This circuit-interrupting device has been shown diagrammatically as a circuit breaker intended to open all three phases. It will be understood, however, that any suitable type of protective device may be used which will open the circuit in response to excess current resulting from failure of one of the capacitors, and that although it has been indicated as a circuit breaker, any other suitable circuit-interrupting device may be used, such as individual fuses in each line, although it is preferable to open all three phases.

The neutral point 12 of the capacitor bank is connected to the neutral conductor 4 and, in order to prevent the flow of harmonic currents, this connection is made through a specially designed reactor 14 by means of conductors 15 and 16. The reactor 14 has an iron core, as indicated at 17, and is designed to saturate at substantially less than the normal phase-to-ground voltage of the system and preferably at about 50% of this voltage. It is also designed to have high reactance for currents of third harmonic frequency under normal conditions when the only voltage across it is the harmonic voltage, which is low compared to the fundamental.

Under normal conditions, there will be no voltage of fundamental frequency between the neutral point 12 and ground, since the capacitor bank constitutes a balanced load. There may, however, be a voltage of third harmonic frequency, because the neutral point for the fundamental is not necessarily the neutral for the harmonics. This harmonic voltage would cause a current flow in the neutral which in many cases would be large enough to cause serious interference on adjacent communication lines, and this would be particularly objectionable because, with the frequencies ordinarily used for power transmission, the third harmonic approaches the frequencies used in telephone work. The reactor 14, however, because of its high reactance and because of its detuning effect substantially prevents the flow of harmonic currents in the neutral.

In the event of failure of one of the capacitors 6, 7 or 8, the full phase-to-ground system voltage is applied across the reactor, and because of its low saturation, its reactance for current of fundamental frequency will be low enough to permit a large flow of current which will insure positive operation of the circuit-interrupting device 13 to isolate the capacitor bank from the line.

One specific example of the effectiveness of this arrangement may be given, involving a 180 kva. star-connected capacitor bank on a three-phase, four-wire, sixty cycle system having a voltage of 2300 volts from phase to ground and of 4000 volts between lines. Before installation of the reactor of the present invention, there was a third harmonic current of 22 amperes in the neutral which was large enough to cause serious inductive interference on adjacent communication lines. After installation of the reactor, the neutral current was reduced to less than $\frac{5}{10}$ of an ampere or a reduction of about 97½%. With full voltage of 2300 volts across the reactor, it permitted a fundamental current of from 125 to 175 amperes or approximately five times the normal load current, thus insuring positive operation of the circuit interrupting device in case of failure of one of the capacitors.

It will be seen, therefore, that a very simple and inexpensive means has been provided for substantially eliminating the flow of harmonic currents in the neutral of a three-phase, four-wire system having a star-connected capacitor bank. It will also be apparent that the usefulness of this arrangement is not limited to the specific application shown herein, but that it may be applied in any similar situation if an analogous problem of inductive interference exists.

Although a specific embodiment of the invention has been illustrated and described, it is to be understood that it is not limited to the precise arrangement shown, but in its broadest aspect it includes all equivalent arrangements and embodiments which fall within the scope of the appended claims.

I claim as my invention:

1. In a polyphase system of electrical transmission and distribution having a grounded neutral conductor, a bank of capacitors connected to the system and having a neutral point, and means connected between said neutral point and said neutral conductor permitting the flow of current of fundamental frequency when the phase-to-ground system voltage is applied thereto but substantially preventing the flow of current under all other conditions.

2. In a polyphase system of electrical transmission and distribution having a grounded neutral conductor, a bank of capacitors connected to the system and having a neutral point, a connection between said neutral point and said neutral conductor, and means in said connection having relatively low reactance for current of fundamental frequency when the phase-to-ground system voltage is applied thereto but relatively high reactance under all other conditions.

3. In a polyphase system of electrical transmission and distribution having a grounded neutral conductor, a bank of capacitors connected to the system and having a neutral point, a connection between said neutral point and said neutral conductor, and a reactor in said connection having relatively low reactance for current of fundamental frequency when the phase-to-ground system voltage is applied thereto but relatively high reactance under all other conditions.

4. In a polyphase system of electrical transmission and distribution having a grounded neutral conductor, a bank of capacitors connected to the system and having a neutral point, a connection between said neutral point and said neutral conductor, and an iron-core reactor in said connection, said reactor being designed to saturate at a substantially lower voltage than the normal phase-to-ground system voltage, and to have high reactance for currents of higher frequency than the fundamental.

5. In a polyphase system of electrical transmission and distribution having a grounded neutral conductor, a bank of capacitors connected to the system and having a neutral point, a connection between said neutral point and said neutral conductor, and an iron-core reactor interposed in said connection, said reactor being designed to saturate at about 50% of the normal phase-to-ground system voltage, and to have high reactance for currents of higher frequency than the fundamental.

6. In a four-wire system of electrical transmission and distribution having three phase conductors and a grounded neutral conductor, a star-connected bank of capacitors, a current-responsive circuit-interrupting device connected between said phase conductors and said capacitor bank, a connection between the neutral point of the capacitor bank and said neutral conductor and means in said connection permitting the flow of a sufficiently large current of fundamental frequency to operate said circuit-interrupting device when the phase-to-ground system voltage is applied to said means but substantially preventing the flow of current under all other conditions.

7. In a four-wire system of electrical transmission and distribution having three phase conductors and a grounded neutral conductor, a star-connected bank of capacitors, a normally closed, current-responsive circuit-interrupting device connected between said phase conductors and said capacitor bank, a connection between the neutral point of the capacitor bank and said neutral conductor and means in said connection having relatively low reactance to current of fundamental frequency when the phase-to-ground system voltage is applied thereto but high reactance under all other conditions.

8. In a four-wire system of electrical transmission and distribution having three phase conductors and a grounded neutral conductor, a star-connected bank of capacitors, a normally closed, current-responsive circuit-interrupting device connected between said phase conductors and said capacitor bank, a connection between the neutral point of the capacitor bank and said neutral conductor and an iron-core reactor in said connection designed to saturate at a substantially lower voltage than the normal phase-to-ground system voltage.

9. In a four-wire system of electrical transmission and distribution having three phase conductors and a grounded neutral conductor, a star-connected bank of capacitors, a normally closed, current-responsive circuit-interrupting device connected between said phase conductors and said capacitor bank, a connection between the neutral point of the capacitor bank and said neutral conductor and an iron-core reactor in said connection designed to saturate at about 50% of the normal phase-to-ground system voltage.

RALPH E. MARBURY.